US008082550B2

(12) United States Patent
O'Toole, Jr.

(10) Patent No.: US 8,082,550 B2
(45) Date of Patent: *Dec. 20, 2011

(54) METHODS AND APPARATUS FOR SELECTING A SERVER TO PROCESS A REQUEST

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 1049 days.

This patent is subject to a terminal disclaimer.

(21) Appl. No.: 11/945,436

(22) Filed: Nov. 27, 2007

(65) Prior Publication Data

US 2008/0072232 A1    Mar. 20, 2008

Related U.S. Application Data

(62) Division of application No. 09/875,521, filed on Jun. 6, 2001, now Pat. No. 7,320,131.

(51) Int. Cl.
*G06F 9/46* (2006.01)
*G06F 15/16* (2006.01)
*G06Q 40/00* (2006.01)

(52) U.S. Cl. ............................ 718/104; 705/40; 709/203

(58) Field of Classification Search .................. None
See application file for complete search history.

(56) References Cited

U.S. PATENT DOCUMENTS

| 3,702,006 A | 10/1972 | Page |
| 5,303,297 A | 4/1994 | Hillis |
| 5,504,704 A | 4/1996 | Sato et al. |
| 5,684,994 A | 11/1997 | Tanaka et al. |
| 5,828,737 A | 10/1998 | Sawyer |
| 6,035,281 A | 3/2000 | Crosskey et al. |
| 6,061,556 A | 5/2000 | Rahman |
| 6,070,052 A | 5/2000 | Ogasawara et al. |
| 6,086,618 A * | 7/2000 | Al-Hilali et al. .................. 703/2 |
| 6,154,643 A | 11/2000 | Cox |
| 6,167,438 A | 12/2000 | Yates |
| 6,208,977 B1 | 3/2001 | Hernandez et al. |
| 6,295,294 B1 | 9/2001 | Odlyzko |
| 6,317,792 B1 | 11/2001 | Mundy |
| 6,556,659 B1 | 4/2003 | Bowman-Amuah |
| 6,625,619 B1 | 9/2003 | McClendon |

(Continued)

OTHER PUBLICATIONS

Black, Jason W. et al. "Survey of Technologies and Cost Estimates for Residential Electricity Services," 2001, IEEE, pp. 255-260.

(Continued)

*Primary Examiner* — Kenneth Tang
(74) *Attorney, Agent, or Firm* — BainwoodHuang

(57) ABSTRACT

The invention is directed to techniques for selecting a resource from several resources to process a request from a client. A client sends the request to a data communications device (e.g., network device or switch), which measures usage information from usage meters associated with each resource (e.g., server). The data communications device then makes a usage estimate for each server of the increase in usage required for that server to process the request from the client. Then the data communications device selects one of the servers depending on the usage estimates required to respond to the client's request. The data communications device can consider other factors such as the current level of usage, past usage, and the increased cost of responding to the request. In addition, the data communications device can consider the peak usage level of each resource already established in a current billing period.

16 Claims, 8 Drawing Sheets

U.S. PATENT DOCUMENTS

| | | | |
|---|---|---|---|
| 6,633,544 B1 | 10/2003 | Rexford | |
| 6,760,324 B1 | 7/2004 | Scott | |
| 7,320,131 B1* | 1/2008 | O'Toole, Jr. | 718/104 |
| 2001/0039586 A1* | 11/2001 | Primak et al. | 709/228 |
| 2002/0007417 A1* | 1/2002 | Taylor et al. | 709/231 |
| 2002/0032777 A1* | 3/2002 | Kawata et al. | 709/226 |
| 2002/0120565 A1* | 8/2002 | Yu et al. | 705/40 |

OTHER PUBLICATIONS

Cao, Zhiruo, et al. "Utility Max-Min: An Application-Oriented Bandwidth Allocation Scheme," 1999, IEEE, pp. 793-801.

Anania, Loretta, et al. "Flat—The Minimalist B-ISDN Rate," Oct. 31, 1988, Telecommunications Policy Research Conference, pp. 1-15.

* cited by examiner

METHODS AND APPARATUS FOR SELECTING A SERVER TO PROCESS A REQUEST

CROSS REFERENCE TO RELATED APPLICATIONS

This patent application is a Divisional of U.S. patent application Ser. No. 09/875,521 filed Jun. 6, 2001, the contents and teachings of which are hereby incorporated by reference in their entirety.

BACKGROUND

Historically, some computers (i.e., clients) have initiated requests for data and/or services to other computers (i.e., servers). Such computers can be connected directly to each other or connected through networks, such as an IP (Internet Protocol) network such as the Internet. The client can direct the request to an intermediary device, such as an intermediary server or other device (e.g., router), that directs the request to one of several servers that can handle the request.

For example, an individual or user of a client makes a request over the Internet to view a video output on the display of the client. The client directs this request to a router that can provide the request to one of several servers, which can provide the video output (e.g., stream of video data) from the server to the client. The router selects the server to handle the request based on some factor, such as balancing the workload among several servers. For example, the router alternates requests among the different servers, so that, over time, each server receives approximately the same number of requests from different clients, and the work load of each server is thus approximately balanced.

The router can make the selection using various other approaches as well. In one conventional approach, the router can receive information on the reported load of each server, and thus direct the request to the server that has the lowest reported load among those available to handle the request. In another conventional approach, the router makes estimates of the network proximity of the client to each available server (e.g., by estimating the number of hops or intermediate connections between the client and each server). In this approach, the router directs the request to a server that is in some network sense "closest" to the client (e.g., has the fewest estimated hops between client and server).

In a further conventional approach, the router makes a determination of the type of request that the client is making (e.g., for video data) and selects a server based on the type of request. In other words, several servers are available to the client, but different servers specialize in providing different types of data (e.g., video, audio, or text data). In another conventional approach, a router can combine several factors, such as workload balancing, network proximity, and request type when selecting a server to respond to the request.

In an additional conventional approach, a network switch maintains a table including information on previous requests from specific clients. Using this approach, the network switch can route a new incoming request from a specific client to a server that the client has used frequently in the past. Thus, a server that serves the same client may provide better performance for that client than some other server the client has not used previously.

SUMMARY

Conventional systems may also determine what price to charge users of computer services based the amount of usage consumption of one or more resources. A resource could be the bandwidth over a network (e.g., MBPS or megabits per second) consumed by a client's request. A resource can also be the amount of processing time consumed by a request from a client (e.g., amount of time taken by the processor in a computer).

Service or resource providers provide access to servers over a network (e.g., internet protocol or IP network such as the Internet). Such resource providers can measure actual bandwidth consumed or used by traffic flowing to or from such servers, and charge a client or service requester. For example, a requester can be a proxy requester (e.g., an Internet service provider or ISP) that handles requests from one or more individuals using the Internet service through local or client computers. Thus a request can be one request from one individual, or many requests provided by a proxy requester. For example, an ISP can provide several requests (e.g., a block of set of requests) to the resource provider, who measures the amount of bandwidth required to access the resources (e.g., servers) and charges the Internet service for the resources provided.

In one conventional approach, the resource provider measures the maximum amount of usage (e.g., of bandwidth) in a billing period (e.g., a month) and charges the requester of the services based on the maximum or peak amount of usage in the billing period (i.e., not for an average usage, such as average daily usage). In one conventional approach, resource providers base their billing on steps. For example, doubling the usage of a resource can cause the cost (e.g., monthly cost) charge to the requester to increase by two times, or perhaps non-linearly such as 1.95 times. In another approach, a 95 percentile rule is applied such that actual measured usage is sub-divided into time periods, and then the top 5% is ignored or discarded for the purposes of billing. The resource provider charges for the usage in this manner because the maximum usage determines how many and what type of servers and network connections the resource provider must install and maintain. In other words, the resource provider must install and maintain resources to handle peak periods of requests, even if there are long periods of times with more moderate levels of request (e.g., late at night). The resource provider wishes to use a pricing policy that encourages requesters to manage and balance their requests so that the resource provider does not receive many requests from different requesters for maximum usage of the same resource (e.g., server or network connection) at the same time.

Currently, data communication devices, such as routers or switches, that select resources (e.g., servers) to handle requests do not typically take into account a usage estimate and/or cost estimate of processing the request. Conventional approaches use a number of factors, such as workload balancing, network proximity, request type, and previous usage of a server, as described previously. Conventional approaches do not typically measure a usage estimate (e.g., increased usage) of directing a request (or block of requests) to an individual server in light of current and/or past usage of the server and do not typically prospectively consider how the cost of a resource will change if a particular request were to be given to a resource for processing.

In contrast, the approach of the invention is to base a selection of a resource on an estimated usage required by a resource to respond to a request based on current and/or past usage of the resource. Thus a data communication device (e.g., network router or switch) can measure usage information for each resource (e.g., from usage meters associated with each resource) that can potentially be used to respond to a request. The data communications device can make cost estimates based on the cost increase (i.e., marginal cost) for each server to handle the request. Past usage can be a relevant factor when considering a peak usage level already established for a resource in a billing period. For example, if responding to the request causes a resource to exceed a billing level or step for that resource (e.g., based on a peak usage level previously established for the current billing period), then the data communications device can decide to send the request to another resource which can process the request without increasing usage to the next billing level or step.

In one embodiment, the invention is directed to a method in a data communications device (e.g., network router) for directing a request to process data. The method includes receiving the request from a client, selecting one of a plurality of resources to process the request from a plurality of resources based on generating an estimated response usage (e.g., a resource usage estimate for processing the request) for each resource of the plurality of resources that reflects a potential usage if responding to the request, and forwarding the request to the selected resource. For example, a data communications device (e.g., router) acting for a service provider (e.g., ISP provider) to route a request can select a server to respond to a request over the Internet that has a lower level of usage when handling the request than some other server that would have a higher level of usage, thus providing a lower cost or better quality of service for the request.

In another embodiment, the method includes generating an estimated available usage for each resource based on the request and usage information received from a usage meter for each resource and selecting one of the resources based on a highest estimated available usage for each resource. For example, a data communications device can use resource meters to measure the usage of each of several servers and select the server that has the greatest amount of workload available to handle a request.

In one embodiment, the invention is directed to a method for selecting a resource from a plurality of resources to process a request from a client. The method includes generating a first cost increase for a first resource of the plurality of resources if the first resource responds to the request and a second cost increase for a second resource of the plurality of resources if the second resource responds to the request, comparing the first cost increase and the second cost increase to determine which one of the first and second cost increases has a lower cost increment, and selecting the resource from the first and second resources to respond to the request from the client based on the lower cost increment. Thus, a data communications device (e.g., network router) that is routing the request for can choose a resource (e.g., server) that can process the request with the least increase in cost compare to some other resource (e.g., server) that would have a greater cost increase to handle the same request.

In another embodiment, the method includes determining that the first cost increase exceeds a preset first cost level and the second cost increase does not exceed a second preset cost level. For example, in a billing system based on cost levels, a data communications device routing a request can avoid being penalized by sending the request to a server that would increase its usage beyond a cost level (e.g., to a more costly level) in order to handle the request.

In one embodiment, the invention is directed to a for selecting a resource (e.g., server) from a plurality of resources (e.g., servers) to process a request from a client. The method includes generating a usage metric (e.g., level of usage) for each resource of the plurality of resources, generating an economic metric (e.g., cost estimate) for each resource based on the usage metric for each resource and the request, and choosing one of the resources to respond to the request for data based on a comparison of the economic metric for each resource. Thus, a data communications device routing a request for a client (e.g., request over the Internet to an ISP) can measure the level of usage of several servers that can handle the request, make cost estimates based on the level of usage and the additional usage estimated to process the request, and then compare the cost estimates to select a server to handle the request.

In another embodiment, the method includes receiving usage information from a usage meter for each resource that measures the amount of usage of each resource over time, generating an estimated base usage of each resource based on the usage information, and generating a peak usage metric for each resource that represents a measurement of the highest level of usage attained for each resource over a current billing period based on the usage information. Some resource providers (e.g., providers of servers and/or communications connections) bill users (clients or proxy requesters acting on behalf of clients) of their services based on the highest level of usage (or peak usage) attained in a billing period (e.g., a month). For example, a data communication device routing a request can measure the peak usage for each server when measuring the usage information from usage meters for each server. Thus, the data communications device can select a server that can handle the request without exceeding the peak usage already established for that server in the current billing period.

In an additional embodiment, the method includes generating an estimated request usage (e.g., additional usage needed to process a request) for each resource that reflects an estimate of the projected usage of each resource over a current time based on the request for data, and generating an estimated available usage (e.g., amount of usage available without exceeding some limit, such as a peak usage metric for that resource) for each resource based on the usage metric for each resource and the estimated request usage for each resource. For example, a data communications device routing a request can determine which servers have available capacity to process a request without setting a new peak usage level for the selected server.

The method includes, in another embodiment, generating the estimated available usage based on the estimated request usage for each resource, an estimated base usage for each resource based on usage information received for each resource, and a peak usage metric for each resource that represents a measurement of the highest level of usage attained for each resource over a current billing period based on the usage information. Thus, a data communications device routing a request can determine which servers have a high level of available usage or capacity to handle the request by relying on past usage information obtained from usage meters for the servers (including peak usage for the current billing period) and the capacity required to process a request. The data communications devices tries to avoid selecting a server that would set a new peak usage level (e.g., a new higher cost for that billing period) if that server handled the request.

In a further embodiment, the method includes identifying a subset of resources wherein the estimated request usage is higher than a predetermined usage limit defined relative to the peak usage metric for each resource, and assigning a predetermined marginal cost to an incremental usage of each resource in the subset. Thus, a data communications device tries to avoid setting a new peak usage for a resource by setting a usage limit below the peak usage limit and selecting a resource that can handle the request without exceeding the usage limit. The data communication device does this because the estimated request usage is an estimate only, and, if in error, could be larger than originally estimated, thus pushing the usage to a new peak usage level, if not using the usage limit to provide a margin of error (e.g., cushion) for the estimated request usage.

The method includes, in an additional embodiment, generating a bandwidth metric that represents the bandwidth requirements for each resource based on (i) the request and (ii) the network address of a client providing the request and the network address of each resource. Thus, the method can be applied to measuring the bandwidth required to access or use a resource (e.g., communication lines and/or network access).

In another embodiment, the method includes generating the economic metric based on a category of the request that indicates an estimated request usage for each resource. The data communications device can route requests based on the type of request (e.g., whether the request is from an individual client or represents a block of requests from many clients provided a proxy requester or ISP service).

In a further embodiment, the method includes comparing an estimated available usage for each resource generated based on the request and the usage metric for each resource. In this case, a data communications device can select a resource based on the one with the greatest available capacity to process a request.

In yet another embodiment, the method includes the use of a function or formula (e.g., F(x)).

Embodiments of the invention also include computer program products such as disks, or other readable media that have a computer-readable medium including computer program logic instructions encoded thereon for selecting a resource to process a request from a client according to the methods and configurations explained above. Such instructions, when executed on a processor on a data communications device, cause the processor to perform any or all of the aforementioned methods.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

The invention is directed to techniques for selecting a resource from several resources to process a request from a client. For example, suppose a user of the client computer (i.e., client) makes a request to view video data over the Internet from a server. The client sends the request to a data communications device (e.g., network device or switch), which measures usage information from usage meters associated with each resource (e.g., server). The data communications device may make a preliminary selection of resources based on the request type or other criteria (e.g., selects servers capable of providing the video data requested by the client). The data communications device then makes a usage estimate for each resource of the additional or increased usage required if that resource were to process the request from the client. Then the data communications device selects one of the resources depending on the estimate of usage required to respond to the client's request. The data communications device can consider other factors in making a selection of a resource such as the current level of usage, past usage, and the increased cost of responding to the request.

In addition, the data communications device can consider the peak usage level of each resource established in a current billing period, when the charges by a resource provider are based on peak usage level rather than some other measure of usage (e.g., average daily usage of each resource). For example, if the estimated usage to respond to the request would increase the peak usage level for a specific resource (e.g., to the next step in a series of usage levels that greatly increases the cost), the data communications device could select another resource for which the estimate usage does not increase the usage of that other resource to another usage level. Thus, the data communications device can take into account usage and/or cost information to select a resource that can handle the request in a cost-efficient manner, while providing the service that the user of the client desires.

Figure 1:
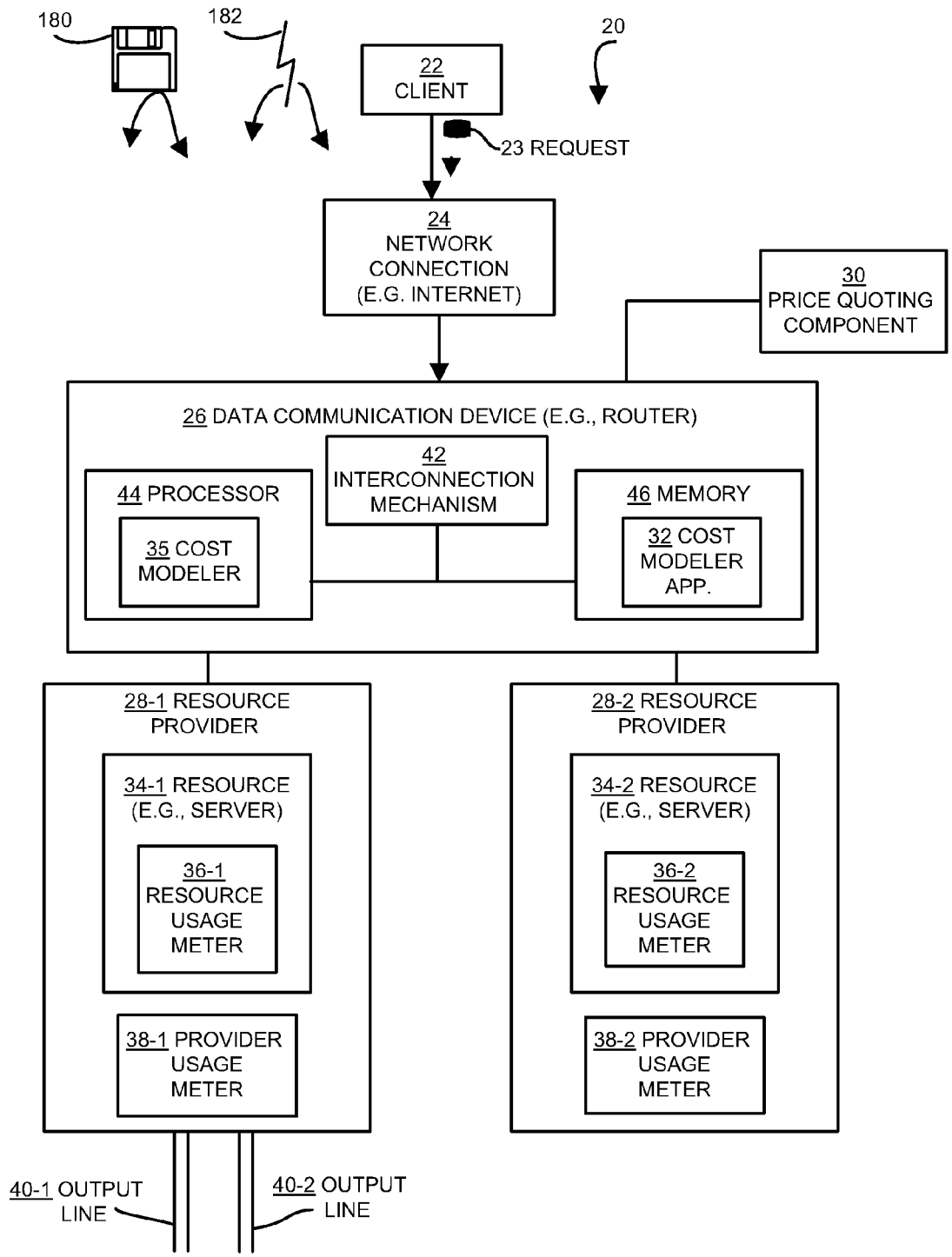
FIG. 1 illustrates a block diagram of an example of a network used by a client making a request to a data communications device for services from a resource.

FIG. 1 illustrates a block diagram of an example of a network 20 used by a client 22 making a request 23 via a network connection 24 (e.g., Internet) to a data communications device 26 for services (e.g., 34-1 and 34-2) suitable for use with embodiments of the invention. The network connection 24 is a network suitable for providing communication connections between computers (e.g., the client 22) and data communication devices 26, and resource providers 28 (e.g., 28-1 and 28-2) that provide one or more resources 34 (e.g., 34-1 and 34-2) that are capable of servicing the request 23 from the client 22.

The client 22 can be a personal computer that a user of the personal computer uses to make a request 23. For example, the user makes a request 23 to view video data over the network connection (e.g., Internet) through an ISP (Internet service provider). In another embodiment, the client 22 is a proxy requester (e.g., an ISP or intermediary server computer) that represents many individual clients 22 (e.g., many users of personal computers). Such a client 22 (e.g., proxy requester) can make a request 23 that represents a block of requests 23 (e.g., a number of requests 23 originating from many individual users). Such a block of requests 23 can be, for example, requests 23 to view the same video data, to access the same web site (e.g., the home web site of an ISP), or all requests 23 received by the ISP in a preset time period in a specified geographical area. For example, the ISP can contract with the resource provider 26 to rent services from a resource provider 28 who provides one or more resources 34 (e.g., web servers) that provide ISP home page services and other services for users of the ISP service. It is to be understood that when a reference herein is made to a request 23 the reference can be to a single request originating from one client 22 or to a block of many requests 23 originating from a proxy requester representing many clients 22. A request 23 can also be one of several different types of requests. For example, a request can be an HTTP (hypertext transport protocol) request, DNS (domain name service) request, or an RTSP (real-time streaming protocol) request.

The data communication device 26 (e.g., network switch or router) includes an interconnection mechanism 42 (e.g., bus), processor 44 (e.g., microprocessor), and memory 46 (e.g., volatile memory and nonvolatile data storage). The memory 46 preferably includes a cost modeler application 32 that provides logic instructions that execute on the processor 44 to form a cost modeler 35 that monitors usage information from each resource 34 and estimates the cost increase for each resource 34, if that resource 34 were to handle a request 23 received by the data communications device 26. The cost increase is the additional cost that the resource provider 28 charges for servicing the request, as will be discussed in more detail for the flow charts shown in FIGS. 2A and 2B.

The cost modeler 35 can also receive input from a price quoting component 30 that provides pricing information for using the resources 34 provided by the resource provider 28. In another embodiment, the price quoting component 30 is maintained as part of the services provided by resource provider 28 (e.g., provided by a computer or server located along with the resources 34 maintained by the resource provider 28). The cost modeler 35 can use the price quoting component 30 to obtain pricing information on the price that will be charged for each resource 34 provided by each of several different resource providers 28.

Each resource provider 28 is a provider of resource 34 through devices (e.g., web servers and/or data storage devices) that the provider maintains and services for clients 22 or proxy requests as (e.g., ISP services) on behalf of clients 22 who are users of resources 34. It is to be understood that when a reference is made herein to a user of resources 34 that the user can be an individual client 22, a server initiating a request 23, or an intermediary service or device (e.g., ISP service) passing one or more requests 23 from one or more originators (e.g., clients 22) to the data communication device 26 to access a resource 34. Each resource 34 has a resource usage meter 36 that provides usage information to the cost modeler 35 for that resource 34. The resource provider 28 can also provide a provider usage meter 38 that monitors the usage of each resource 34 for billing purposes. The cost modeler 35 receives usage information from the resource usage meter 36 that is typically more current or frequent than what the cost modeler 35 would receive if relying only on the provider usage meter 38 for each resource 34. In another embodiment, the cost modeler 35 receives information from the provider usage meter 38 for each resource 34, or alternatively receives only information from the provider usage meter 38 without requiring a resource usage meter 36. For example, the usage meters (e.g., 36 and 38) can provide usage information on the bandwidth required to respond to a request 23. More specifically, a usage meter 36-1 can measure the bandwidth in MBPS to provide a stream of video data from a resource 34-1 that is provided in response to a request 23 from a client 22. The usage meters (e.g., 36 and 38) can also provide information on the amount of time required to service a request (e.g., number of seconds of processing time on a resource 34), amount of data storage space (e.g., disk space) required to service a request, or consumption of any other computing or communication resource 34 used by a computer or electronic device in responding to the request 23.

In one example, the resource provider 28 is a "landlord" that provides a physical space (e.g., building) that has a number of communication connections, servers and data storage devices connected in a network. In such an example, the resource provider 28 rents out services (e.g., bandwidth, disk space, or other resources) to users (e.g., ISP services) of the services. In another embodiment, the resource provider 28 is not required to provide resources 34 all in one physical location, but may have devices and services located in different physical locations. As described above, the resource provider 28 can maintain a provider usage meter 38 associated with a resource 34 (or group of resources) that the resource provider 28 uses to determine how much to bill each user of each resource 34.

A resource provider, such as resource provider 28-1, can provide output lines 40 (e.g., 40-1 and 40-2) that a resource 34-1 can use when responding to a request 23 (e.g., a request 23 from a proxy requester to transfer a large number of individual HTTP requests 23 through an output line 40 to an Internet backbone network). For example, a client 22 can request that data be provided to some other device (e.g., client 22 or server) through one or the other of the output lines 40 (e.g., providing a direct cable or connection to the other device or a connection to a network). Each output line 40 can have a different bandwidth and/or cost associated with using the line 40, and the cost modeler 35 utilizes the cost information about each line 40 when determining which line 40 a resource 34 should use to respond to a request 23. In alternate embodiments, the lines 40 can represent physical connections or virtual connections (e.g., a pipe provided by a communications provider) that have different pricing associated with each line (e.g., 40-1 or 40-2). The resource provider 28 can use a provider usage meter 38 to monitor the usage of each line 40, and charge a user of the line 40 based on the usage (e.g., bandwidth used by the user to respond to a request 23).

In a general summary, a client 22 makes a request 23 to an intermediary (e.g., ISP provider) which provides the request 23 to a data communication device 26 (e.g., router) that selects a resource 34 to respond to the request 23 based on usage information from a usage meter 36 and cost information, such as from a price quoting component 30. The additional FIGS. 2 through 6B will provide more details on the process of selecting a resource 34 to respond to a client 22.

In one embodiment, a computer program product 180 including a computer readable medium (e.g., one or more CD-ROM's, diskettes, tapes, etc.) provides software instructions for the cost modeler application 32. The computer program product 180 can be installed by any suitable software installation procedure, as is well known in the art. In another embodiment, the software instructions can also be downloaded over a wireless connection. A computer program propagated signal product 182 embodied on a propagated signal on a propagation medium (e.g., a radio wave, an infrared wave, a laser wave, sound wave, or an electrical wave propagated over the Internet or other network) provides software instructions for the cost modeler application 32. In alternate embodiments, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instructions for a software application sent in packets over a network over a period of seconds, minutes, or longer. In another embodiment, the computer readable medium of the computer program product 180 is a propagation medium that the computer can receive and read, such as by receiving the propagation medium and identifying a propagated signal embodied in the propagation medium, as described above for the computer program propagated signal product 182.

Figure 2A:
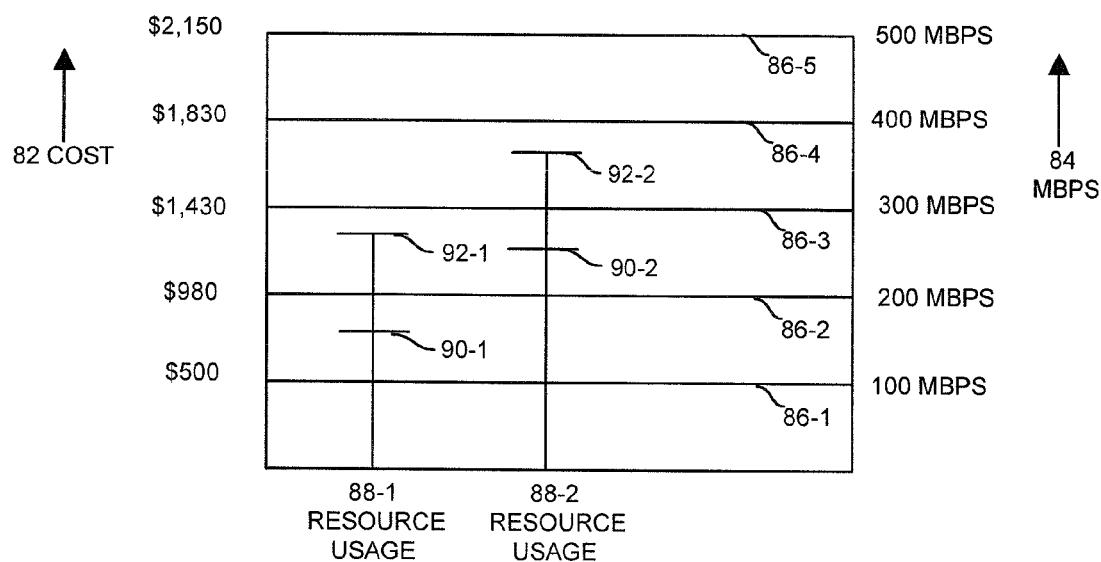
FIGS. 2A and 2B illustrate graphs of resource usage at different cost levels that provides cost information suitable for use with the invention.
Figure 2B:
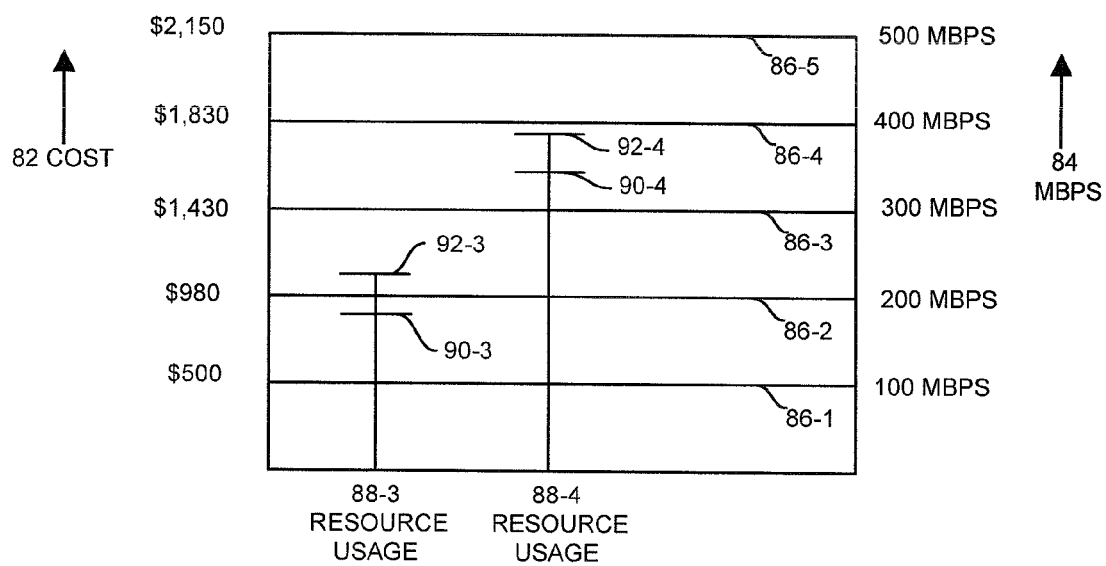

FIGS. 2A and 2B illustrate graphs of resource usage 88 (e.g., 88-1, 88-2, 88-3, and 88-4) at different cost levels 86 (e.g., 86-1, 86-2, 86-3, 86-4, and 86-5) that provides cost information suitable for use with the invention. In FIGS. 2A and 2B, the cost levels 86 represent different levels of costs 82 that a resource provider 28 charges a user of a resource 34 (e.g., based on amount of bandwidth that the resource 34 requires to respond to a request 23). Level 86-1 is a cost level of $500 if a user of a resource 34 uses the resource at a level of 0 to 100 MBPS. Level 86-2 represents a cost level of $980 if a user of a resource 34 uses the resource at a level from 100 to 200 MBPS. Level 86-3 represents a cost level of $1,430 if a user of a resource 34 uses the resource at a level from 200 to 300 MBPS. Level 86-4 represents a cost level of $1,830 if a user of a resource 34 uses the resource at a level from 300 to 400 MBPS. Level 86-5 represents a cost level of $2,150 if a user of a resource 34 uses the resource at a level from 400 to 500 MBPS. As indicated by the difference in cost ($500 versus $980) between level 86-1 and level 86-2, the cost, in the examples shown in FIGS. 2A and 2B, is not proportional (i.e., is not linear) to the increase in resource usage 88, but changes when moving from one level 86 to another level 86. Such non-linear behavior continues at higher levels as well (e.g., the increase in cost from $1,830 to $2,150 between levels 86-4 and 86-5).

The current usage 90 (e.g., levels 90-1, 90-2, 90-3, and 90-4) indicates the amount of the current usage of a resource 34 without any additional load that would be required to respond to a request 23. The estimated response usage 92 (e.g., 92-1, 92-2, 92-3, and 92-4) indicates the amount of usage of a resource 34 the cost modeler 35 estimates would be required to respond to a particular request 23. In some cases, the current usage 90 can set a peak usage 51, as described in more detail later for FIG. 4. For example, if the highest current usage 90 in a billing period (e.g., one month) is the current usage 90-1 shown for resource usage 88-1, then the peak usage 51 for that billing period would be cost level 86-2. In such an example, then if the resource usage 88-1 increases to 92-1 (e.g., if the resource 34 represented by 88-1 responds to a request) then the peak usage 51 would increase to cost level 86-3 for that billing period (see FIG. 4 for more discussion of peak usage 51).

As shown in FIG. 2A, the resource usage 88-1 for a resource 34 indicates that the estimated response usage 92-1 compared to the current usage 90-1 increases the cost from level 86-2 to 86-3. The resource usage 88-2 for a resource 34 indicates that the estimated response usage 92-2 compared to the current usage 90-2 increases the cost level from 86-3 to 86-4. In one scenario for FIG. 2A, the cost modeler 35 chooses the resource 34 indicated by resource usage 88-1 (e.g., 34-1) because the estimated resource usage 92-1 indicates a lower cost level (i.e., 86-3) than the cost level (i.e., 86-4) indicated by estimated resource usage 92-2.

In another example as shown in FIG. 2B, the resource usage 88-3 for a resource 34 (e.g., 34-1) indicates that the estimated response usage 92-3 compared to the current usage 90-3 increases the cost from level 86-2 to 86-3. The resource usage 88-4 for a resource 34 (e.g., 34-2) indicates that the estimated response usage 92-4 compared to the current usage 90-4 maintains the cost at the same level, that is, cost level 86-4. In one scenario for FIG. 2B, when comparing resource usage 88-3 to resource usage 88-4, the cost modeler 35 might choose the resource 34-1 indicated by resource usage 88-3 because the cost level 86-3 is lower than the cost level 86-4 indicated by the estimated resource usage 92-4 for the resource 34-2 indicated by resource usage 88-4.

Figure 3A:
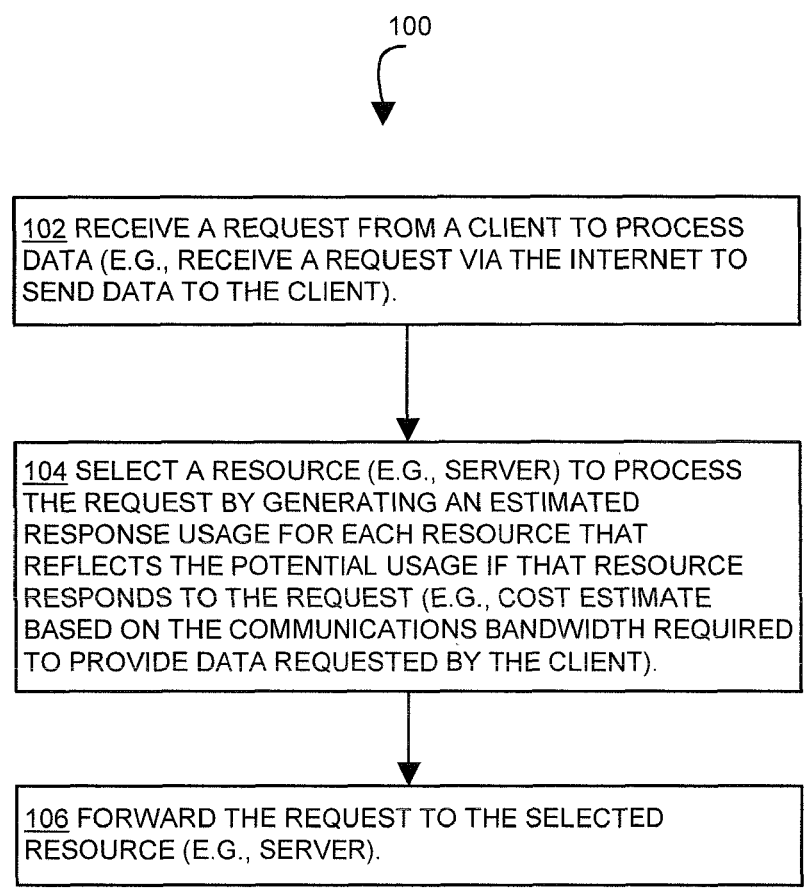
FIG. 3A is a flow chart of a procedure that directs a request received from a client to a resource that handles the request generally performed by embodiments of the invention.
Figure 3B:
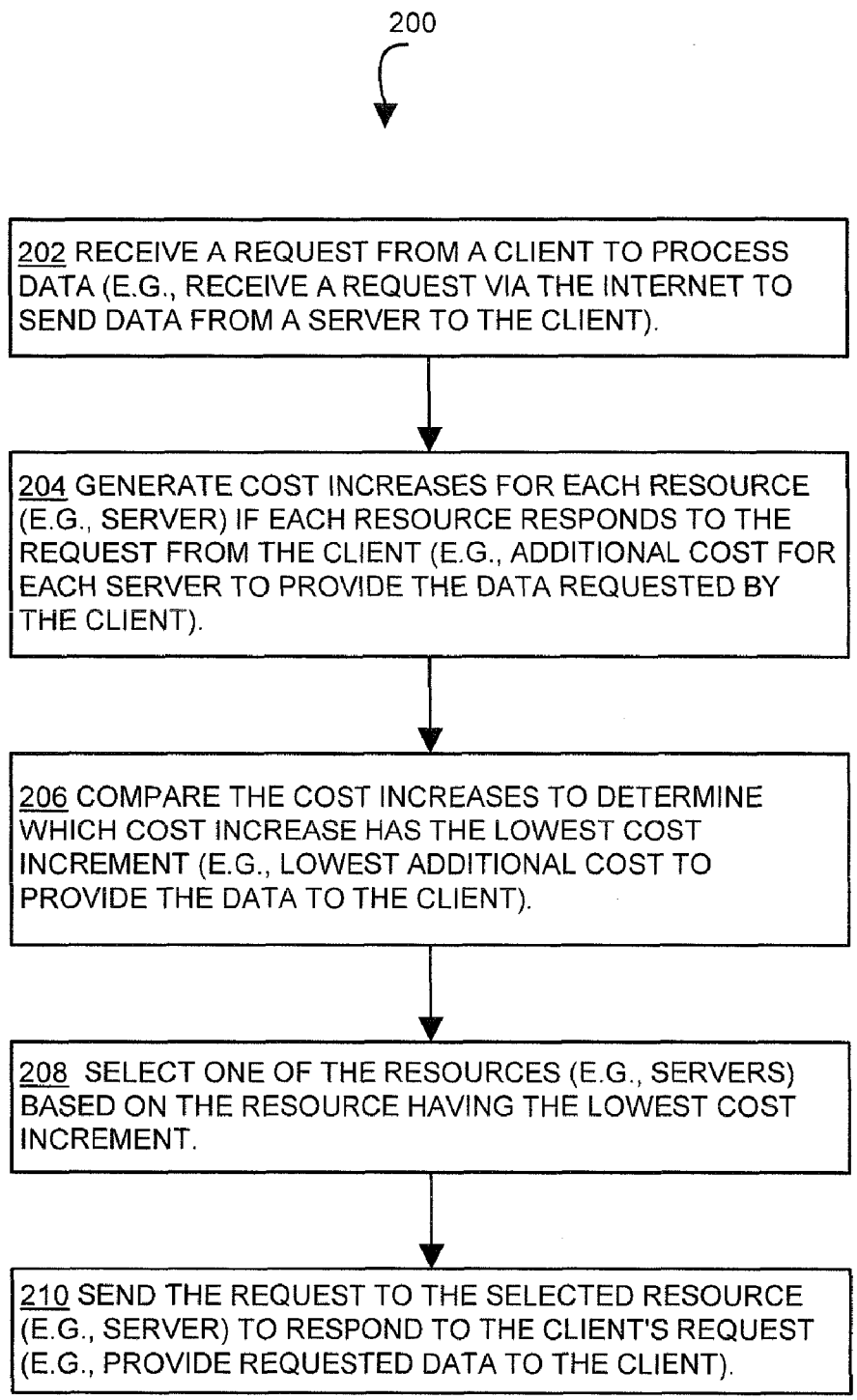
FIG. 3B is a flow chart of a procedure that generates cost increases for each resource when selecting a resource to handle a request from a client, according to embodiments of the invention.

However, depending upon the configuration of the invention, in another scenario for FIG. 2B, the cost modeler 35 might choose the resource 34-2 indicated by resource usage 88-4 because the increase in usage to estimated response usage 92-4 does not cause an increase beyond the next cost level (i.e., to cost level 86-5), whereas the increase in usage to estimated response usage 92-3 does cause an increase to the next cost level (e.g., to cost level 86-3) for the resource 34 indicated by resource usage 88-3. However, the estimated response usage 92-4 is an estimate only. In yet a further scenario for FIG. 2B, the cost modeler 35 does not choose the resource 34-2 indicated by resource usage 88-4 because the estimated response usage 92-4 is too close (e.g., according to a margin of error or other present limit) to the next cost level 86-4 (e.g., if the calculation of the estimated response usage 92-4 is in error, then the resource usage 88-4 might increase to the next cost level 86-5, which is a very expensive level 88 compared to the other cost levels 88). FIGS. 3A through 3B discuss in more detail the process of selecting which resource 34 to use to respond to a request 23.

FIG. 3A is a flow chart of a procedure 100 that directs a request 23 received from a client 22 to a resource 34 that handles the request 23, as generally performed by embodiments of the invention.

In step 102, the data communication device 26 receives a request 23 from a client 22 to process data (e.g., receive a request 23 via the Internet to send data to the client 22). The client 22 can be an individual client 22 or a proxy requester (e.g., ISP) handling the request 23 on behalf of a client 22, as described previously. For example, the client 22 makes a request 23 to view video data over the Internet, to access a stock brokerage account over the Internet, or to store data provided with the request 23. Alternatively, the client may be a process and the cost modeler 35 may be another process that serves to provide a binding to the client 22 upon receiving the request 23. The binding is simply an identification of a specific resource provider 28 from a group of such resource providers 28-1 through 28-N. In such cases, the request 23 may contain the name of a service or a group of servers or resources to which that the client 22 desires access.

In one embodiment, the data communications device 26 engages in a pre-selection process to determine which resources 34 are capable of handling the request 23 (e.g., based on content, geographical location, or on other factors). For example, the data communications device 26 may be able to route a request 23 to ten resources 34 (e.g., web servers) but only five of the resources 34 can provide the video data requested by the client 22. In another example, the data communications device 26 may pre-select a number of resources 34 based on their geographical location or proximity to the client 22 (e.g., web servers that are physically close to the client 22). Then, after such a pre-selection process, the data communications device 26 provides the identities of these pre-selected resource(s) 34 to the cost modeler 35 to select one of them to respond to the request 23, as described in step 104.

In step 104, the cost modeler 35 (i.e., the processor 44 of the data communications device 26 operating according to the instructions of the cost modeler application 32) selects a resource 34 (e.g., server) to process the request 23 by generating an estimated response usage 92 (as described for FIGS. 2A and 2B) for each resource 34 that reflects the potential usage if that resource 34 were to respond to the request 23. For example, the cost modeler 35 calculates a cost estimate for using each resource 34-1 and 34-2 based on the communications bandwidth required to provide data requested by the client 22. This can be referred to or consider as a "binding step" in which the client 22 is a requester that provide in the request 23 containing the name of a service or a group of servers or resource providers 28 to which that client 22 would like to communicate. Step 104 then performs the binding decision to determine what particular server or resource provider 26 will handle the service on behalf of the client 22.

Then, the cost modeler 35 selects one of the resources (e.g., 34-1). For example, in FIG. 2A, the cost modeler 35 selects the resource 34 indicated by resource usage 88-1, because the estimated response usage 92-1 indicates a cost level 86-3 that is lower than the cost level 86-4 indicated by estimated response usage 92-2, as discussed previously. The cost modeler 35 can consider other scenarios, such as not choosing a resource 34 when the estimated response usage 92-3, as shown in FIG. 2B, increases costs to the next level (e.g., from level 86-2 to 86-3). Alternatively, the cost modeler 35 can choose the resource 34 based on the lowest estimated response usage 92-3, as shown in FIG. 2B regardless of whether it causes a cost increase to the next cost level 86. In yet another embodiment, the cost modular 35 is configured to divide actual measured usage into multiple time periods (e.g., the top 5% and remaining 95%) and discard one or more of the usages for the purposes of billing (e.g., discard the top 5%).

In step 106, the data communications device 26 forwards the request 23 to the resource 34 selected in step 104. In an alternative embodiment of this step, in step 106, the data communications device 26 provides the name of one resource provider 28 from the group 28-1 through 28-N to which the client is now "bound." In other words, in an alternative, the cost modeler 35 or the data communications device 26 itself may not handle the sending of the request to the particular resource chosen in step 104, but rather, will send the identity of the selected resource back to the process or system (e.g., the client 22) from which the request in step 102 was received and this process or request originator will handle providing requests (e.g., for a service) to the particular resource provider identified in step 104.

FIG. 3B is a flow chart of a procedure 200 that generates (e.g., determines) cost increases for each resource 34 when selecting a resource 34 to handle a request 23 from a client 22, according to embodiments of the invention.

In step 202, the data communications device 26 receives a request 23 from a client 22 to process data (e.g., receives a request 23 via the Internet to send data from a server to the client 22).

In step 204, the cost modeler 35 generates cost increases for each resource 34 (e.g., server) if each resource 34 responds to the request 23 from the client 22 (e.g., the additional cost for each server to provide the data requested by the client 22). For example, the cost modeler 35 determines the current usage (e.g., 90-1 in FIG. 2A) for a resource 34 based on usage information received from a resource usage meter 36 associated with the resource, and then calculates an estimated response usage (e.g., 92-1) that reflects the total usage if the resource 34 were to respond to the request 23. The cost modeler 35 can then estimate the cost increase based on the estimated increase in usage. For example, the cost modeler 35 can determine for the resource 34 indicated by resource usage 88-1 in FIG. 2A that the cost increase would be $900 (e.g., $900 per month) because the estimated response usage 92-1 increases the cost 82 from cost level 86-2 (i.e., $400) to cost level 86-3 (i.e., $1500). Thus the cost increase is the difference between level 86-3 and 86-2 (i.e., $1500-400 $900). By a similar method of calculation, the cost modeler 35 calculates that the resource 34 indicated by resource usage 88-2 would have a cost increase of $3500 because the estimated response usage 92-2 raises the cost level 86 from cost level 86-3 ($1500) to cost level 86-4 ($5000), and thus the difference between the cost levels 86-3 and 86-4 is $3500 (i.e., $5000−1500=$3500).

In step 206, the cost modeler 35 compares the cost increases to determine which cost increase has the lowest cost increase (e.g., lowest additional cost to provide data to the client 22). For example, based on FIG. 2A, the cost modeler 35 compares the cost increase ($900) for resource usage 88-1 to the cost increase ($3500) for resource usage 88-2, as calculated above for step 204.

In step 208, the cost modeler 35 selects one of the resources 34 (e.g., servers) based on the resource 34 having the lowest cost increment. For example, based on FIG. 2A, the cost modeler 35 chooses the resource 34 indicated by resource usage 88-1 because the resource usage 88-1 represents the lowest cost increment. In other words, the cost increment ($900) for resource usage 88-1 is less than the cost increase ($3500) for resource usage 88-2.

In one embodiment, the data communications device 26 can include other factors in addition to determining the lowest cost increment when selecting the resource 34. For example, along with cost increment determination made in step 204, the data communications device 26 can include other factors in the selection decision such as the proximity of the resource 34 to the client 22 (e.g., geographical distance or network proximity or distance between the client 22 and the resource 34), quality of service the client 22 is expected to receive, and other factors.

In step 210, the data communications device 26 sends the request 23 to the selected resource 34 (e.g., server) to respond to the client's 22 request 23 (e.g., provide the requested data to the client 22). For example, based on FIG. 2A, the data communications device 26 sends the request 23 to the resource 34 represented by resource usage 88-1 because resource usage 88-1 indicates the lowest cost increment, as calculated in step 206.

In an alternative embodiment of step 210, the data communications device 26 sends an identity of the selected resource back to a process or device that provided the request received in step 202. In this manner, the requesting process, such as client 22, simply uses the invention to chose what particular resource provider 28 will be used to provide a service to the client 22 form a group of such resource providers 28. In this manner, the system of the invention does not handle forwarding of requests to one or more of the resource providers 28, but simply provides a binding mechanism for a client 22 or other process or device to be given the identity of a particular server or resource provider 28 which that client 22 is responsible for contacting.

Figure 3C:
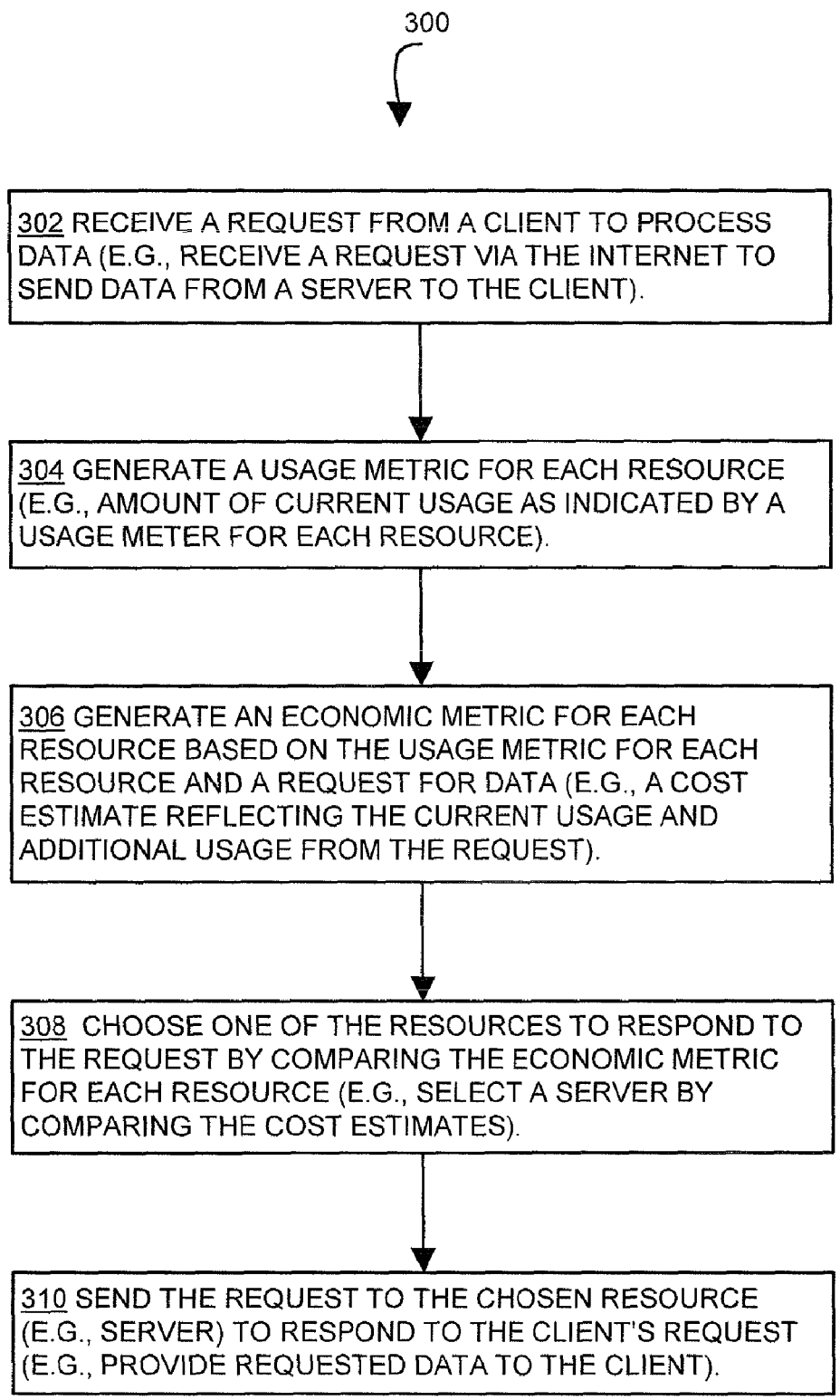
FIG. 3C is a flow chart of a procedure that selects a resource using usage and economic metrics according to embodiments of the invention.

FIG. 3C is a flow chart of a procedure 300 that selects a resource 34 using usage metrics and economic metrics according to embodiments of the invention. In step 302, the data communications device 26 receives a request 23 from a client 22 to process data (e.g., receive a request 23 via the Internet to send data from a server to the client 22).

In step 304, the cost modeler 35 generates a usage metric for each resource 34 (e.g., amount of current usage 90 as indicated by a resource usage meter 36 for each resource 34). For example, the cost modeler 35 receives usage information from the resource usage meter 36 (or the provider usage meter 38) for each resource 34 that indicates the current usage or workload for that resource, such as the bandwidth level (e.g., level of MBPS 84) of a resource 34. The cost modeler 35 then generates a usage metric, such as a current usage 90 for the resource 34, as shown in FIGS. 3A and 3B.

In step 306, the cost modeler 35 then generates an economic metric (e.g., cost estimate or cost increase) for resource 34 based on the usage metric for each resource 35 and a request 23 for data (or other services). For example, the cost modeler 35 generates a cost estimate reflecting the current usage 90 and the additional usage if the resource 34 processes the request 23. Thus, the cost modeler 35 makes a calculation of the estimated response usage 92 for each resource 34, as shown in FIGS. 3A and 3B, and then can determine a cost estimate for each resource 34 if the resource 34 processes the request 23. For example, from the estimated response usage 92-3, the cost modeler 35 can determine that the cost increase of using the resource 34 represented by resource usage 88-1 is $900 (the difference between cost level 86-2 and cost level 86-3).

In step 308, the cost modeler 35 chooses one of the resources 34 to respond to the request 23 by comparing the economic metric for each resource 34 (e.g., select a server by comparing the cost estimates). For example, in FIG. 2A, the cost modeler 35 chooses the resource 34 represented by resource usage 88-1 because the cost increase is less than the cost increase for the resource represented by resource usage 88-2, as discussed previously.

In step 310, the data communication device 26 sends the request 23 to the chosen resource 34 (e.g., server) to respond to the client's 22 request 23 (e.g., provide the requested data to the client 22). An alternative configuration of step 310 provides that the data communications device 26 sends the identity of the chosen resource back to the device or process that provided the requested received in step 302.

Figure 4:
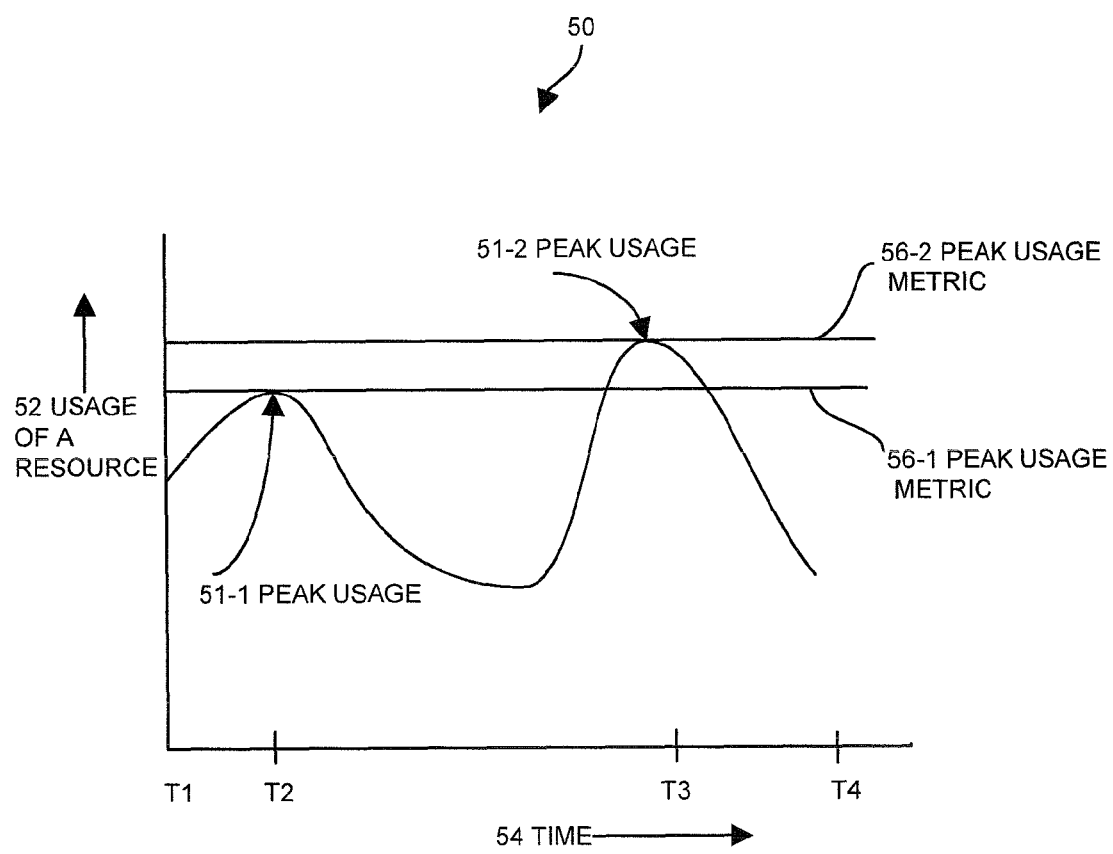
FIG. 4 illustrates a graph of peak usage patterns providing one form of usage information suitable for use with the invention.

FIG. 4 illustrates a graph 50 of peak usage patterns providing one form of usage information suitable for use with the invention. The graph 50 in FIG. 4 shows a vertical axis showing the level of usage of a resource 52 (e.g., the amount of bandwidth or processing time of a resource 34 consumed in responding to one or more requests 23 from clients 22). The horizontal axis of the graph 50 is a measure of time 54 from a point in time T1 to another point in time T4 (e.g., the amount of usage of a resource 52 over a period of time, such as a billing period of one month with T1 indicating the beginning of the month and T4 indicating the end of the month). For example, a resource provider 28 monitors the usage 52 of a resource 34 provided by the resource provider 28 by a client 22 (e.g., individual client 22 or a number of clients 22 represented by proxy requester, such as an ISP) over a period of time, such as by monitoring a provider usage meter 38 that records the usage of a resource 34 for that client 22. In such a case, the resource provider 28 then calculates a bill for that client 22 based on the amount of usage 52 during the billing period. For example, the resource provider 28 calculates the bill based on the average usage by the client 22 during the billing period.

In another example, the resource provider 28 calculates the bill based on a peak usage 51 (e.g., 51-1 and 51-2, as shown in FIG. 4) during a billing period (e.g., month). As shown in FIG. 4, the period of time 54 shown in the graph 50 is a billing period from T1 to T4 (e.g., a month) and the usage 52 of a resource 34 first peaks at peak usage 51-1. The peak usage 51-1 establishes a peak usage metric 56-1 up to that point in time T2 in the billing period. The peak usage metric 56 is an example of a usage metric that a cost modeler 35 measures by obtaining usage information from the resource usage meter 36 for the resource 34 represented in the graph 50. In a peak usage 51 approach, the resource provider 28 charges the client 22 based on the peak usage 51, regardless of whether the client 22 has any usage 52 of the resource 34 after establishing a peak usage 51-1. The resource provider 28 takes such an approach to encourage clients 22 (or a proxy requester representing clients 22) to balance their workloads and avoid overload situations where many clients 22 all request large amounts of usage 52 at the same time. As shown in FIG. 4, a client 22 establishes a second peak usage 51-2 a point T3 in time. In the example in FIG. 4, the resource provider 28, if using a peak usage 51 approach, then bills the client 22 based on the maximum peak usage 51, which is the second peak usage 51-2, regardless of how much time the client 22 used the resource 34 at a lower level of usage, as shown in FIG. 4, where most of the usage 52 is at a lower level than the peak usage 51-2.

In one embodiment, the cost modeler 35 for a client 22 (e.g., ISP service) monitors the peak usage 51 for a resource 34 used by a client 22 (e.g., ISP service) by receiving input from a resource usage meter 36 for each resource 34. The cost modeler 35 thus establishes a usage metric, referred to as the peak usage metric 56 when referring to measuring peak usage 51, for the use of that resource 34 by the specific client 22 (e.g., ISP service). In FIG. 4, the cost modeler 35 establishes one peak usage metric 56-1 at time T2 for the peak usage 51-1. The cost modeler 35 can thus use the peak usage metric 56-1 in estimating the cost of usage 52 the resource 34, as described further for FIGS. 5A, 5B, 6A, and 6B. The cost modeler 35 continues to monitor the usage 52 of the resource 34, and establishes a new peak usage metric 56-2, as shown in FIG. 4 at time T3, if the peak usage 51 reaches a higher level, as in peak usage 51-2, within the same billing period (i.e., before time T4, which indicates the end of the billing period).

In one embodiment, the cost modeler 35 measures peak usage metrics 56 based on the maximum level of usage 52, as shown by the peak usage metric 56-2 in FIG. 4. In another embodiment, the cost modeler 35 measures a peak usage metric 56 based on a number of steps or cost levels 86 as shown in FIGS. 2A and 2B, in which case the peak usage metric 56 is based on the cost level 86 set by the highest level of current usage 90 in a billing period (e.g., monthly period). For example, if the current usage 90 has reached a certain cost level 86, then the peak usage metric 56 is set equal to that cost level 86 even if the current usage 90 does not again reach that cost level 86.

Figure 5A:
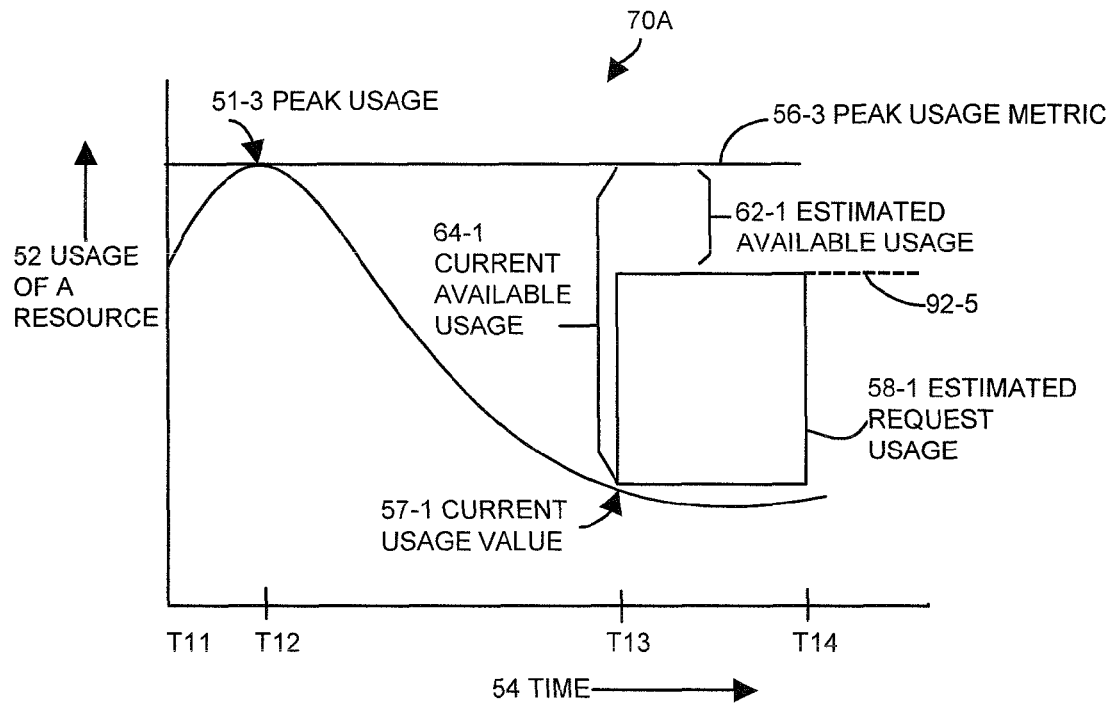
FIGS. 5A and 5B illustrate graphs that represent examples of estimates of resource usage for processing a request from a client.
Figure 5B:
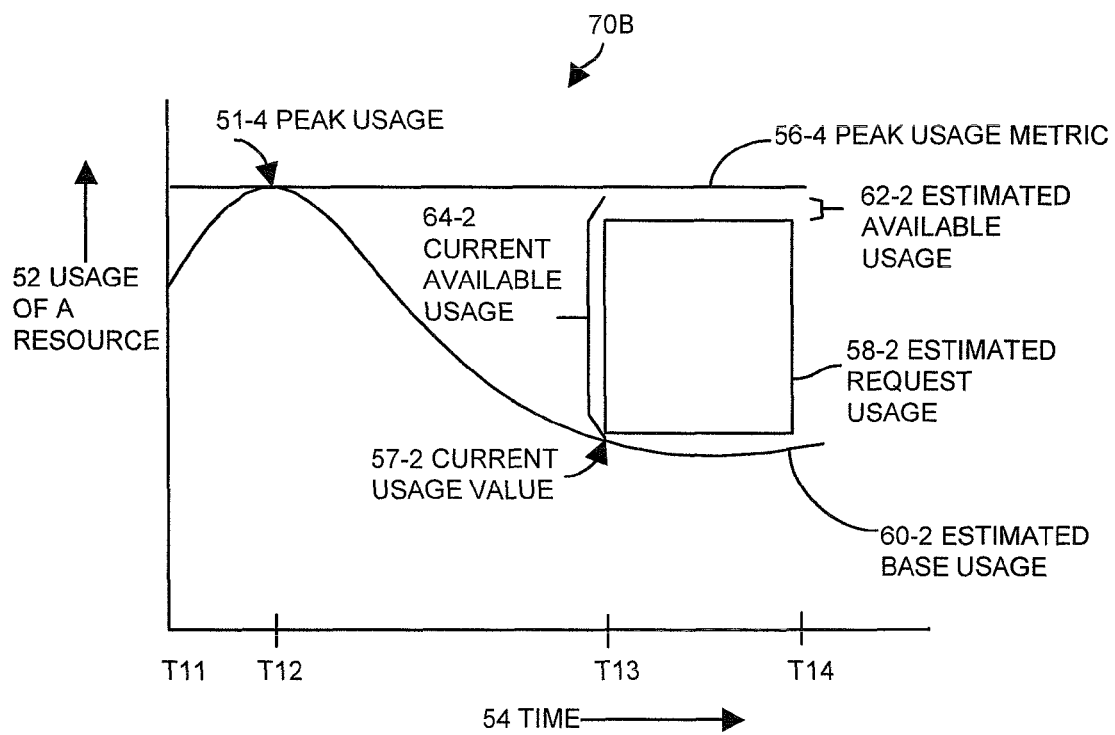

FIGS. 5A and 5B illustrate graphs 70A and 70B that represent examples of estimates of resource usage 52 for processing a request 23 from a client 22 (e.g., individual client 22 or proxy requester representing one or more clients 22). In one embodiment, the time period from T11 to T14 indicated in graphs 70A and 70B is within one billing period (e.g., one month from T11 to T14).

In graph 70A in FIG. 5A, the usage 52 of a resource 34 that is required to respond to a request 23 reaches a peak at peak usage 51-3 at time T12, which the cost modeler 35 uses to establish a peak usage metric 56-3 for the use of that resource 34. The cost modeler 35 also receives usage information (e.g., from a resource usage meter 36 for that resource 34) and uses the usage information to measure a current usage value 57-1 for that resource 34, which represents a current usage at the time T13 that the cost modeler 35 is evaluating that resource 34 to determine whether to select that resource 34 to respond to a pending request 23 that the data communication device 26 has received or to select a different resource 34 to respond to the sending request 23. In a similar manner as for graph 70A, the cost modeler determines for graph 70B a peak usage metric 56-4 and current usage value 57-2 for the resource 34 represented in graph 70B. Graphs 70A and 70B show, as an example only, the peak usages 51-3 and 51-4 at time T12 on both graphs 70A and 70B. In other examples, the peak usages 51-3 and 51-4 are typically at different points in time for different resources 34.

The cost modeler 35 also calculates a current available usage 64-1 for the resource 34 represented in graph 70A. In one embodiment, the cost modeler 35 calculates the current available usage 64-1 by subtracting the current usage value 57-1 from the peak usage metric 56-3. Thus the current available usage 64-1 represents the amount of usage 52 that is available for the resource 34 represented in graph 70A to respond to a request 23 without exceeding the peak usage metric 56-3. The resource 34 represented in graph 70A may be able to provide a higher level of usage 52 beyond that indicated by the peak usage metric 56-3, but the cost modeler 35 tries to avoid such a scenario because the cost modeler 35 tries to choose a resource 34 that can respond to a request 23 without exceeding the peak usage metric 56 for that resource 34. In a similar manner as described for graph 70A in FIG. 5A, the cost modeler 35 determines a current available usage 64-2 for another resource 34 represented in graph 70B in FIG. 5B.

The cost modeler 35 also estimates an estimated request usage 58-1 that indicates the amount of usage 52 required by the resource 34 represented in graph 70A to respond to the current pending request 23. The estimated request usage 58-1 indicates the amount of additional usage required beyond the current usage value 57-1 (or beyond an estimated base usage 60-1 estimated by the cost modeler 35 from past usage information received for the resource usage meter 36 for the resource 34 in graph 70A and/or other information indicating what the typical usage 52 of that resource 34 is). The estimated request usage 58-1 is shown as a box on graph 70A that indicates an amount of usage 52 required to respond to the request 23, as indicated by the top line of the box, shown for example by estimated response usage 92-5 in FIG. 5A, which is one example of the estimated response usage 92 described for FIGS. 2A and 2B. The estimated request usage 58-1 also indicates an amount of time that the cost modeler 35 estimates will be required by the resource 34 represented in graph 70A to respond to the request 23. For example, the request 23 could be a request 23 from a proxy requester (e.g., an ISP) to respond to all clients 22 (or all clients 22 in a geographical area) for a specified time period (e.g., from time T13 to time T14 in graph 70A). For example, the request 23 could be a request 23 from an ISP indicating that 4,000 individual users (e.g., individuals logged on to the Internet) will apply 20 MB of load to the resource 34 (e.g., web server) for an hour. In addition, a request 23 can be an HTTP request, a DNS query, or an RTSP request. The cost modeler 35 can use the type of the request 23 as a factor in determining the estimated request usage 58. For example, the HTTP or RTSP request are typically individual requests 23, although each request 23 can vary in amount of time required. However, a proxy requester can also group requests 23 (e.g., HTTP requests) into a block of requests 23. A DNS request can be a request 23 based on a DNS proxy, and then the cost modeler 35 can make an estimate based on past experience on how many individual users are using the DNS proxy (e.g., for an ISP, a single request 23 based on a DNS proxy can represent requests 23 from millions of users). In a similar manner to what is described for graph 70A, the cost modeler 35 determines an estimated request usage 58-2 for another resource 34 represented in graph 70B.

In addition, the cost modeler 35 determines an estimated available usage 62-1 for the resource 34 represented in graph 70A. In one embodiment, the cost modeler 35 subtracts the current usage value 57-1 (or estimated base usage 60-1) and the estimated request usage 58-1 from the peak usage metric 56-3 to calculate the estimated available usage 62-1. In a similar manner, the cost modeler 35 determines the estimated available usage 62-2 for the resource 34 represented in graph 70B.

The cost modeler 35 then compares the estimated available usage 62 for each resource 34 in graph 70A and graph 70B. In one scenario, the cost modeler 35 selects the resource 34 with the larger estimated available usage 62-1 as shown in graph 70A compared to a smaller estimated available usage 62-2 as shown in graph 70B. The estimated request usage 58 and the estimated available usage 62 are estimates only, and the estimated request usage 58 may exceed the peak usage metric 56 if the estimate of the estimated request usage 58 is in error. By selecting the resource 34 represented in graph 70A with the larger estimated available usage 62-1, the cost modeler 35 minimizes any risk that the estimated request usage 58-1 would exceed the peak usage metric 56-3.

In another scenario, the cost modeler 35 also considers other factors beyond the estimated available usage 62. If the peak usage metric 56-4 in graph 70B is much lower than the peak usage metric 56-3 in graph 70A, then the cost modeler 35 can decide to choose the resource 34 represented in graph 70B, if the cost modeler 35 estimates that any possible error in estimating the estimated request usage 58-2 still would not increase the peak usage metric 56-4 for graph 70B to a higher level than the peak usage metric 56-3 already established in graph 70A. In addition, the cost modeler 35 may consider any steps or cost levels 86 as described previously for FIGS. 2A and 2B (e.g., if the peak usage metric 56 is based on a cost level 86), that would cause a large increase in the cost, if an estimated request usage 58 is in error.

Thus the cost modeler 35 tries to make a selection that minimizes any increase in cost based on the peak usage metric 56 for each resource 34, as well as other factors such as the size of the estimated available usage 62 for each resource 34 and the impact of a cost structure involving steeply increasing cost levels 86.

Figure 6A:
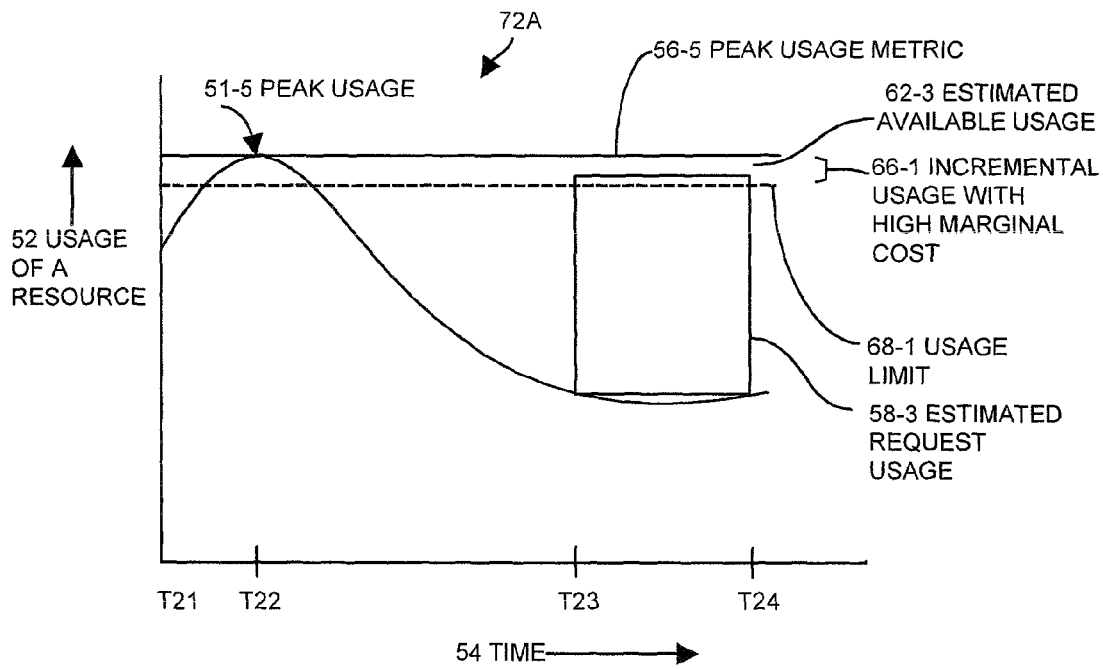
FIGS. 6A and 6B illustrate graphs that represent examples of estimates of incremental usage of a resource for processing a request from a client.
Figure 6B:
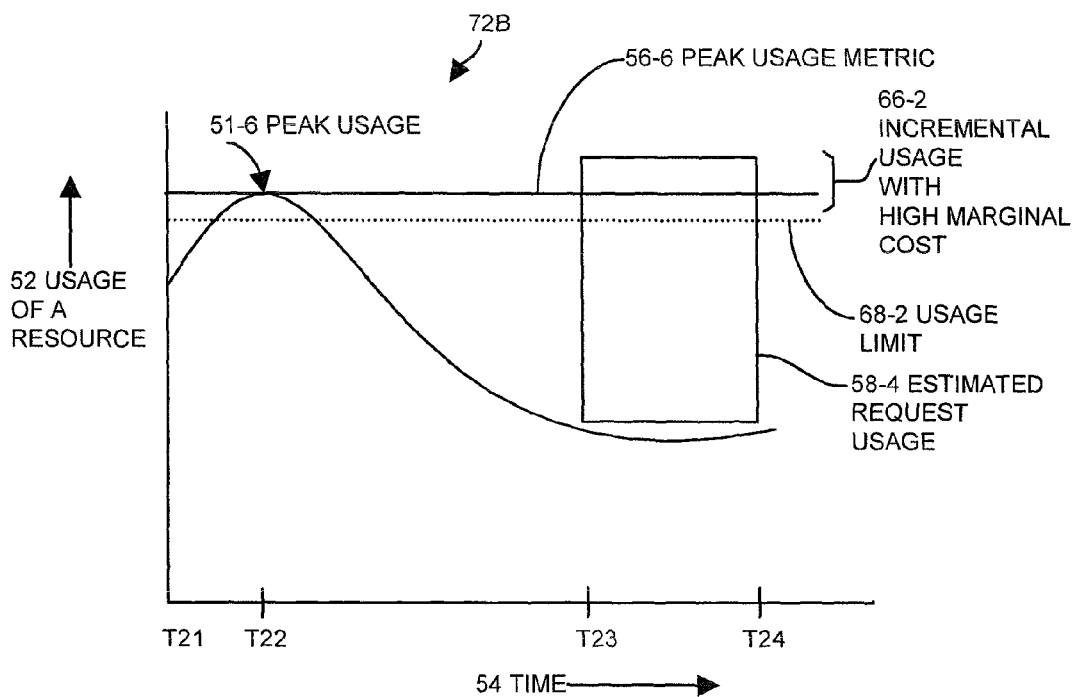

FIGS. 6A and 6B illustrate graphs 72A and 72B that represent examples of estimates of incremental usage 66 of a resource 34 for processing a request 23 from a client 22. In one embodiment, the time period from T21 to T24 in graphs 72A and 72B represents one billing period (e.g., one month from T21 to T24). Graph 72A shows a peak usage 51-5 at time T22 that the cost modeler 35 uses to establish a peak usage metric 56-5, as described for FIGS. 5A and 5B. Similarly, graph 72B shows a peak usage 51-6 at time T22 that the cost modeler 35 uses to establish a peak usage metric 56-6. Graphs 72A and 72B show, as an example only, the peak usages 51-5 and 51-6 at time T22 on both graphs 72A and 72B. In other examples, the peak usages 51-5 and 51-6 are typically at different points in time for different resources 34.

The graphs 72A and 72B also show a usage limit 68 (e.g., 68-1 in graph 72A and 68-2 in graph 72B) that the cost modeler 35 sets in relation to the peak usage metric 56. For example, for graph 72A, the cost modeler 35 sets the usage limit 68-1 as some percentage of the peak usage metric 56-5 (e.g., 95% of the peak usage metric 56-5). Then, the cost modeler 35 can use the usage limit 68 when estimating the cost of using a resource 34 to respond to a request 23. For example, in graph 72A, the estimated request usage 58-3 exceeds the usage limit 68-1 (i.e., the top part of the box that represents the estimated request usage 58-3 in the graph 72A is above the line representing the usage limit 68-1). Thus, for that resource 34 represented in graph 72A, the cost modeler 35 determines an incremental usage 66-1 above the usage limit 68-1 and below the peak usage metric 56-5 that has a high marginal cost. In other words, if the estimated request usage 58-3 exceeds the usage limit 68-1, the cost modeler 35 assigns a high cost in the cost estimate for using that resource 34, even if the estimated request usage 58-3 does not exceed the peak usage metric 56-5. The cost modeler 35 takes the approach of assigning a high marginal cost because the estimated request usage 58-3 is an estimate only and the cost modeler 35 wishes to avoid the risk that the usage 52 will exceed the peak usage metric 56-5 if there is an error in the determination by the cost modeler 35 of the estimated request usage 58-3, as discussed previously Thus, the cost modeler 35 is likely to choose a resource 34 where the estimated request usage 58 is below the usage limit 66 for that resource 34 compared to a resource 34 where the estimated request usage 58 is above the usage limit 66.

In another example, a 95% rule is applied against the internal measurements (rather than the peak). That is, the top 5% of the internal measurements are discarded or not used, and the remaining 95% is used.

In another example, as shown in graph 72B in FIG. 6B, the estimated request usage 58-4 exceeds the usage limit 68-2, as well as also exceeding the peak usage metric 56-6. In this example, the cost modeler 35 would assign a very high marginal cost to the incremental usage 66-2 shown in graph 72B, and thus would calculate a very high cost estimate for using the resource 34 represented in graph 72B, because the estimated request usage 58-4 exceeds the peak usage metric 56-6. In one scenario, if the cost modeler 35 is choosing between the resource 34 represented in graph 72A and the resource 34 represented in graph 72B to respond to a request 23, the cost modeler 35 is most likely to choose the resource 34 represented in graph 72A because that resource has the smaller incremental usage 66.

In another scenario, the cost modeler 35 can still choose the resource 34 represented in graph 72B to respond to the request 23 based on other factors, for example, if the peak usage metric 56-6 established for graph 72B has a much lower value than the peak usage metric 56-5 established for graph 72A. In such a case, the cost modeler 35 can assign a relatively low marginal cost to the cost estimate for graph 72B because the peak usage metric 56-6 for graph 72B has a relatively low value (e.g., compared to a much higher peak usage metric 56-5 for graph 72A).

In another scenario, comparing graph 72A shown in FIG. 6A to the graph 70A shown in FIG. 5A, the cost modeler 35 is likely to choose the resource represented in graph 70A to respond to a request 23 because the estimated available usage 62-1 in graph 70A is larger than the estimated available usage 62-3 shown in graph 72A, and because the estimated request usage 58-3 in graph 72A has exceeded the usage limit 68-1 that the cost modeler 35 established for graph 72A (assuming that the estimated request usage 58-1 in graph 70A has not exceeded any usage limit 68 established for the resource 34 represented in graph 70A).

While this invention has been particularly shown and described with references to preferred embodiments thereof, it will be understood by those skilled in the art that various changes in form and details may be made therein without departing from the spirit and scope of the invention as defined by the appended claims.

For example, the client 22 can be any type of computer or electronic device that can make a request 23. The client 22 can be a palmtop, laptop, or personal computer. The client can also be a cell phone or other electronic device capable of being used to make a request 23 (e.g., voice request converted into a request 23). The client 22 can also be a server (e.g., web server) or other computer making a request 23 (e.g., over the Internet).

In addition, the data communications device 26 can be any suitable type of electronic or network device that can select a resource 34 to receive a request 23. For example, the data communication device 26 can be a network router, a network switch, a network gateway, a network bridge, a server computer (e.g., web server) or other electronic device or computer. Furthermore, the cost modeler 35 can be implemented on any such data communication device 26, or the cost modeler 35 can be implemented in a separate computer, server, or other device that then communicates to a network router, switch, or other network device where to send a request 23.

In a further example, the cost modeler 35 can use various approaches in estimating the costs of using different resources 34 to respond to a request 23. For example, the cost modeler 35 can use an analytic cost model constructed using symbolic formulas and compute marginal costs by taking formal derivatives using calculus. In addition, the cost modeler 35 can use specific mathematical formulas to compute marginal costs. Furthermore, the cost modeler 35 can use stochastic methods that compute predicted marginal costs based on historical usage data (e.g., usage 52 of a resource 34 obtained from one or more usage meters 36 and/or 38) from prior billing periods or based on information about future service commitments for each resource 34, or more generally, for each resource provider 28.

In another alternative configuration, a resource provider 28 can consult with the cost modeler 35 in the data communications device to determine its "rating" or cost metric in relation to other resource providers 28 for the same service. In this manner, the resource provider 28 can determine when it is approaching or hitting its peak and will thus be aware of when its marginal cost is going to rise. When this occurs, the resource provider 28 can redirect requests to another resource provider, or back to the client 22 in order to be "served" elsewhere, by another resource provider. In other words, since the cost modeler is capable of calculating the statistical rating of each resource provider 28, then the resource 34 can query the cost modeler to determine where is ranks in its usage statistics. If the resource 34 determines that is approaching a peak usage level that it does not want to exceed, it can proactively redirect requests for its service to other resource 34 in other resource providers 28.

What is claimed is:

1. A method in a data communication device for selecting a resource from a plurality of resources to process a request from a client, comprising the steps of:
   generating a first cost increase for a first resource of the plurality of resources if the first resource responds to the request and a second cost increase for a second resource of the plurality of resources if the second resource responds to the request;
   comparing the first cost increase and the second cost increase to determine one of the first and second cost increases that has a lower cost increment; and
   selecting one of the first resource and the second resource to respond to the request from the client based on the lower cost increment,
   wherein generating the first and second cost increases includes generating an estimated request usage and an estimated available usage for each resource, the estimated request usage for a resource reflecting an estimate of the projected usage of the resource over a current time based on the request for data, and the estimated available usage for a resource being based on a usage metric for the resource and the estimated request usage for the resource, the estimated available usage being generated by:
      identifying a subset of the plurality of resources for which the estimated request usage is higher than a predetermined usage limit defined relative to a peak usage metric for each resource, the peak usage metric for a resource representing a measurement of the highest level of usage attained for the resource over a current billing period based on the usage information; and
      assigning a predetermined marginal cost to an incremental usage of each resource in the subset.

2. The method of claim 1, wherein comparing the first cost increase and the second cost increase comprises determining that the first cost increase exceeds a first preset cost level and the second cost increase does not exceed a second preset cost level.

3. The method of claim 1, wherein the first and second cost increases are part of corresponding first and second cost estimates for processing the request, and further comprising generating an estimated response usage for each resource of the plurality of resources that reflects a potential usage if responding to the request, said estimated response usage for the first and second resources including the respective first and second cost estimates, and wherein selecting one of the first and second resources is based on said estimated response usage.

4. The method of claim 3, wherein selecting one of the first and second resources comprises:
   generating an estimated available usage for each resource based on the request and on usage information received from a usage meter for each resource; and
   selecting the resource based on a highest estimated available usage for each resource.

5. The method of claim 1, wherein the first and second cost increases are part of corresponding first and second economic metrics for the first and second resources generated based on the corresponding usage metric for each resource and the request, and wherein the selecting is based on a comparison of the first and second economic metrics for the first and second resources.

6. The method of claim 5, wherein generating the economic metric comprises generating a bandwidth metric that represents the bandwidth requirements for each resource based on (i) the request and (ii) the network address of a client providing the request and the network address of each resource.

7. The method of claim 5, wherein generating the economic metric comprises generating the economic metric based on a category of the request that indicates an estimated request usage for each resource.

8. The method of claim 1, wherein:
   generating the estimated available usage comprises generating the estimated available usage based on the estimated request usage for each resource, an estimated base usage for each resource based on usage information received for each resource, and the peak usage metric for each resource.

9. A data communications device for selecting a resource from a plurality of resources to process a request from a client, comprising:
   a memory that stores a cost modeler application;
   an interconnection mechanism; and
   a processor coupled to the memory by the interconnection mechanism, wherein the processor operates in accordance with instructions of the cost modeler application stored in the memory to select the resource, the instructions of the cost modeler application configuring the processor to:
   generate a first cost increase for a first resource of the plurality of resources if the first resource responds to the request and a second cost increase for a second resource of the plurality of resources if the second resource responds to the request;
   compare the first cost increase and the second cost increase to determine one of the first and second cost increases that has a lower cost increment; and
   select one of the first resource and the second resource to respond to the request from the client based on the lower cost increment,
   wherein to generate the first and second cost increases the processor is operative to generate an estimated request usage and an estimated available usage for each resource, the estimated request usage for a resource reflecting an estimate of the projected usage of the resource over a current time based on the request for data, and the estimated available usage for a resource being based on a usage metric for the resource and the estimated request usage for the resource, the estimated available usage being generated by:
      identifying a subset of the plurality of resources for which the estimated request usage is higher than a predetermined usage limit defined relative to a peak usage metric for each resource, the peak usage metric for a resource representing a measurement of the highest level of usage attained for the resource over a current billing period based on the usage information; and
      assigning a predetermined marginal cost to an incremental usage of each resource in the subset.

10. The data communications device of claim 9, wherein the cost modeler application comprises further instructions that configure the processor to determine that the first cost increase exceeds a first preset cost level and the second cost increase does not exceed a second preset cost level.

11. The data communications device of claim 9, wherein:
   the first and second cost increases are part of corresponding first and second cost estimates for processing the request;
   the cost modeler application comprises further instructions that configure the processor to generate an estimated response usage for each resource of the plurality of resources that reflects a potential usage if responding to the request, said estimated response usage for the first and second resources including the respective first and second cost estimates; and the processor selects one of the first and second resources based on said estimated response usage.

12. The data communications device of claim 11, wherein the cost modeler application comprises further instructions that configure the processor to:

generate an estimated available usage for each resource based on the request and on usage information received from a usage meter for each resource; and select the resource based on a highest estimated available usage for each resource.

13. The data communications device of claim 9, wherein the first and second cost increases are part of corresponding first and second economic metrics for the first and second resources generated based on the corresponding usage metric for each resource and the request, and wherein the cost modeler application comprises further instructions that configure the processor to select either the first or second resource based on a comparison of the economic metric for each resource.

14. The data communications device of claim 13, wherein the cost modeler application comprises further instructions that configure the processor to generate a bandwidth metric that represents the bandwidth requirements for each resource based on (i) the request and (ii) the network address of a client providing the request and the network address of each resource.

15. The data communications device of claim 13, wherein the cost modeler application comprises further instructions that configure the processor to generate the economic metric based on a category of the request that indicates an estimated request usage for each resource.

16. The data communications device of claim 9, wherein the cost modeler application comprises further instructions that configure the processor to generate the estimated available usage based on the estimated request usage for each resource, an estimated base usage for each resource based on usage information received for each resource, and the peak usage metric for each resource.

* * * * *